(12) United States Patent
Snape et al.

(10) Patent No.: US 10,641,128 B2
(45) Date of Patent: May 5, 2020

(54) GAS TURBINE ENGINE OIL TANK WITH INTEGRATED PACKAGING CONFIGURATION

(71) Applicant: United Technologies Corporation, Farmington, CT (US)

(72) Inventors: Nathan Snape, Tolland, CT (US); Gabriel L. Suciu, Glastonbury, CT (US); Simon Pickford, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 181 days.

(21) Appl. No.: 15/914,519

(22) Filed: Mar. 7, 2018

(65) Prior Publication Data

US 2018/0195413 A1 Jul. 12, 2018

Related U.S. Application Data

(63) Continuation of application No. 13/541,935, filed on Jul. 5, 2012, now Pat. No. 9,945,252.

(51) Int. Cl.
| | |
|---|---|
| *F01D 25/18* | (2006.01) |
| *F01D 25/12* | (2006.01) |
| *F02C 7/06* | (2006.01) |
| *F02C 7/14* | (2006.01) |
| *F02C 7/32* | (2006.01) |
| *B64D 29/08* | (2006.01) |
| *B64D 33/00* | (2006.01) |

(Continued)

(52) U.S. Cl.
CPC ............. *F01D 25/18* (2013.01); *B64D 29/08* (2013.01); *B64D 33/00* (2013.01); *F01D 25/12* (2013.01); *F02C 7/06* (2013.01); *F02C 7/14* (2013.01); *F02C 7/32* (2013.01); *F01M 5/002* (2013.01); *F05D 2260/2214* (2013.01); *F16N 19/00* (2013.01); *Y02T 50/675* (2013.01); *Y02T 50/676* (2013.01)

(58) Field of Classification Search
CPC .......... F01D 25/22; F01D 25/18; F01D 25/12; B64D 33/00; B64D 29/08; F02C 7/185; F02C 7/32; F02C 7/14; F02C 7/06; F05D 2260/2214
See application file for complete search history.

(56) References Cited

U.S. PATENT DOCUMENTS

| | | |
|---|---|---|
| 3,722,624 A | 3/1973 | Buckland |
| 3,797,561 A | 3/1974 | Clark et al. |

(Continued)

OTHER PUBLICATIONS

Supplementary European Search Report for European Patent Application No. 13813054.7 completed Oct. 23, 2015.

(Continued)

*Primary Examiner* — Brian P Wolcott
(74) *Attorney, Agent, or Firm* — Carlson, Gaskey & Olds, P.C.

(57) ABSTRACT

A gas turbine engine includes a fan case radially outwardly of a core compartment. A compressor section is located within an engine core compartment and includes a front mount flange and an aft mount flange. An oil tank is mounted to at least one of the fan case or the front and aft mount flanges. The oil tank has a cooling structure integrated into an outer surface such that the oil tank is subjected to cooling air flow from a plurality of air sources.

19 Claims, 3 Drawing Sheets

(51) Int. Cl.
*F01M 5/00* (2006.01)
*F16N 19/00* (2006.01)

(56) References Cited

U.S. PATENT DOCUMENTS

| | | | |
|---|---|---|---|
| 4,020,632 A | 5/1977 | Coffinberry et al. | |
| 4,041,697 A | 8/1977 | Coffinberry et al. | |
| 4,254,618 A * | 3/1981 | Elovic | F02C 7/185 60/226.1 |
| 4,546,605 A | 10/1985 | Mortimer et al. | |
| 4,887,424 A | 12/1989 | Geidel et al. | |
| 5,177,951 A | 1/1993 | Butler | |
| 5,241,814 A | 9/1993 | Butler | |
| 5,587,068 A | 12/1996 | Aho, Jr. et al. | |
| 5,610,341 A | 3/1997 | Tortora | |
| 7,377,098 B2 * | 5/2008 | Walker | F01D 9/065 184/6.11 |
| 7,454,894 B2 | 11/2008 | Larkin et al. | |
| 7,509,793 B2 | 3/2009 | Tumelty et al. | |
| 2005/0235651 A1 | 10/2005 | Morris et al. | |
| 2006/0101804 A1 | 5/2006 | Stretton | |
| 2007/0084185 A1 | 4/2007 | Moniz et al. | |
| 2007/0234704 A1 | 10/2007 | Monix et al. | |
| 2008/0073460 A1 | 3/2008 | Beardsley et al. | |
| 2008/0095611 A1 * | 4/2008 | Storage | F01D 25/125 415/116 |
| 2012/0060508 A1 | 3/2012 | Alecu et al. | |
| 2012/0114467 A1 * | 5/2012 | Elder | F02K 3/115 415/178 |

OTHER PUBLICATIONS

International Search Report and Written Opinion for International Application No. PCT/US2013/048871 completed on Sep. 16, 2013.
International Preliminary Report on Patentability for International Application No. PCT/US2013/048871 dated Jan. 15, 2015.
European Search Report for European Application No. 16165513.9 dated Aug. 10, 2016.

* cited by examiner

GAS TURBINE ENGINE OIL TANK WITH INTEGRATED PACKAGING CONFIGURATION

REFERENCE TO RELATED APPLICATION

This application is a continuation of U.S. application Ser. No. 13/541,935 filed on Jul. 5, 2012.

BACKGROUND

This disclosure relates to an oil tank for a gas turbine engine.

Lubrication systems for gas turbine engines require significant amounts of lubrication oil, which must be provided to numerous internal and external components during operation. Typically, an oil pump is mounted on an accessory gearbox, which may be located at various locations relative to the gas turbine engine, for example, within core and/or fan nacelles.

Geared turbo fan engines have increased oil demands and consequently generate larger heat loads than conventional jet engines. Oil tanks located in the vicinity of the accessory gearbox have fluid lines running to the gearbox, oil pump, engine sump, and oil coolers, for example. As such, the oil tank takes up a large percentage of packaging volume on the engine; however, the tank itself is generally empty during engine operation. Further, the additional thermal loads of the engine require additional oil coolers to keep operational temperatures within acceptable levels.

SUMMARY

In one exemplary embodiment, a gas turbine engine comprises an engine static structure, a fan case supported relative to the engine static structure by a radial structure, a compressor section and a turbine section housed within the engine static structure, and a combustor section arranged axially between the compressor section and the turbine section. A core nacelle encloses the engine static structure to provide a core compartment. An oil tank is mounted within the core compartment between a compressor mount flange and a firewall and has a cooling structure integrated into an outer surface of the oil tank such that the oil tank is subjected to cooling air flow from a plurality of air sources. A main oil fill portion of the oil tank extends aft of the firewall. A service oil fill connection is located in front of the firewall and extends through a fan exit guide vane to a fan case structure.

In a further embodiment of the above, the cooling structure comprises an oil cooler integrally formed in the outer surface of the oil tank, the oil cooler including a plurality of ribs extending outwardly from the outer surface.

In a further embodiment of any of the above, the oil tank comprises a main oil fill compartment that provides a main supply of lubrication for engine components, and wherein the cooling structure comprises an oil cooler that is integrally formed in the outer surface of the oil tank.

In a further embodiment of any of the above, the plurality of air sources comprises at least one of fan air, core ventilation air, free stream air, and core bleed air.

In a further embodiment of any of the above, a nacelle door interface is incorporated into the outer surface of the oil tank.

In a further embodiment of any of the above, the nacelle door interface comprises one of a seal land or an inner v-groove incorporated into the outer surface of the oil tank.

In a further embodiment of any of the above, an accessory gearbox is mounted on the engine static structure and is configured to provide rotational drive to accessory drive components, and wherein the accessory gearbox is arranged within the core compartment with the oil tank and cooling structure being enclosed within the core compartment in a position axially forward of the accessory gearbox.

In a further embodiment of any of the above, the compressor mount flange comprises a front compressor mount flange and wherein the compressor includes an aft compressor mount flange wherein the oil tank is mounted to the aft compressor mount flange at the firewall.

In a further embodiment of any of the above, an oil pump defines a centerline, and wherein the firewall includes an opening through which the main oil fill portion of the oil tank extends in an aft direction to provide a main supply interface at a firewall plane that is above the centerline of the oil pump.

In another exemplary embodiment, a gas turbine engine comprises an engine static structure, a fan case supported relative to the engine static structure by a radial structure, a compressor section and a turbine section housed within the engine static structure, and a combustor section arranged axially between the compressor section and the turbine section. A core nacelle encloses the engine static structure to provide a core compartment. An oil tank is mounted within the core compartment between a compressor mount flange and a firewall and has a cooling structure integrated into an outer surface of the oil tank such that the oil tank is subjected to cooling air flow from a plurality of air sources. The compressor mount flange comprises a front compressor mount flange and wherein the compressor includes an aft compressor mount flange where the oil tank is mounted to the aft compressor mount flange at the firewall.

In a further embodiment of any of the above, the cooling structure comprises an oil cooler integrally formed in the outer surface of the oil tank, the oil cooler including a plurality of ribs extending outwardly from the outer surface.

In a further embodiment of any of the above, the oil tank comprises a main oil fill compartment that provides a main supply of lubrication for engine components, and wherein the cooling structure comprises an oil cooler that is integrally formed in the outer surface of the oil tank.

In a further embodiment of any of the above, the plurality of air sources comprises at least one of fan air, core ventilation air, free stream air, and core bleed air.

In a further embodiment of any of the above, an accessory gearbox is mounted on the engine static structure and is configured to provide rotational drive to accessory drive components, and wherein the accessory gearbox is arranged within the core compartment with the oil tank and cooling structure being enclosed within the core compartment in a position axially forward of the accessory gearbox.

In a further embodiment of any of the above, an oil pump defines a centerline, and wherein the firewall includes an opening through which the main oil fill portion of the oil tank extends in an aft direction to provide a main supply interface at a firewall plane that is above the centerline of the oil pump.

In a further embodiment of any of the above, a main oil fill portion of the oil tank extends aft of the firewall, and including a service oil fill connection located in front of the firewall and extending through a fan exit guide vane to a fan case structure.

BRIEF DESCRIPTION OF THE DRAWINGS

The disclosure can be further understood by reference to the following detailed description when considered in connection with the accompanying drawings wherein.

DETAILED DESCRIPTION

Figure 1:
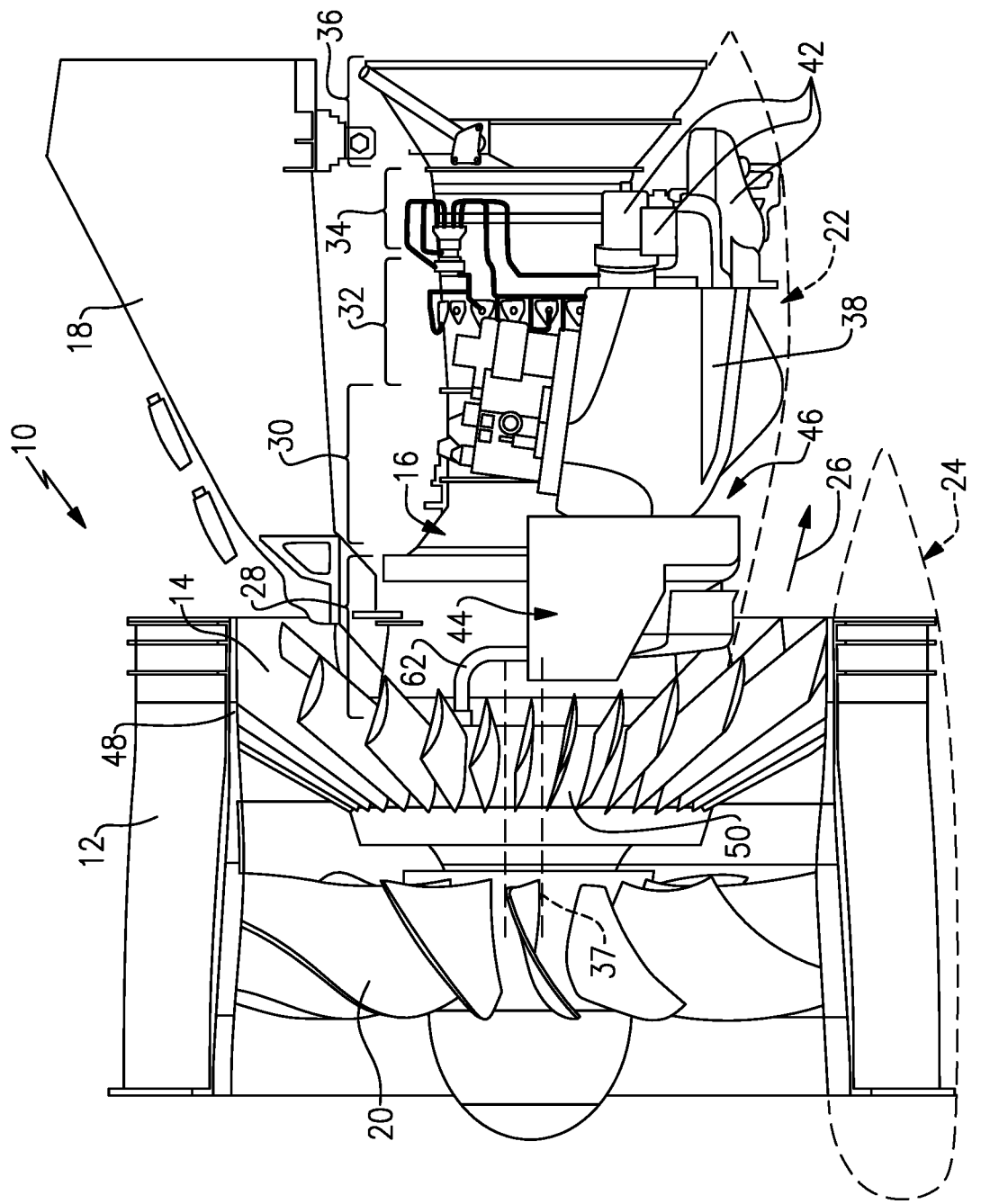
FIG. 1 is a schematic side perspective view of an example gas turbine engine.

An exemplary gas turbine engine 10 is schematically depicted in FIG. 1. The engine 10 may be a high bypass engine, as shown, or any other desired configuration. It should be understood that the disclosed features, such as the oil tank, oil fill and core nacelle described below may relate to other types of engines.

The engine 10 includes a fan case 12 supported relative to an engine static structure 16 by a radial structure, such as flow exit guide vanes 14, for example. Alternatively, struts may provide the radial structure 14. The engine 10 is supported relative to an airframe by a pylon 18.

A fan 20 is housed within the fan case 12, and a fan nacelle 24 surrounds the fan case 12. A core nacelle 22 surrounds the engine static structure 16 and provides a bypass flowpath 26 together with the fan nacelle 24.

The positions of a low pressure compressor section 28, high pressure compressor section 30, combustor section 32, high pressure turbine section 34, and low pressure turbine section 36 within the engine static structure 16 are schematically depicted. The example engine 10 includes a dual spool arrangement in which the low pressure compressor section 28 and low pressure turbine section 36 are mounted on an inner spool, and the high pressure compressor section 30 and high pressure turbine section 34 are mounted on an outer spool. It should be understood, however, that a two spool engine 10 is for exemplary purposes only. A three spool engine 10 may also incorporated and fit within the spirit of the claims. A spool 37 is schematically depicted in FIG. 1 and may be an inner spool, for example, either coupled to the fan 20 directly or coupled to the fan 20 by a geared architecture.

An accessory gearbox 38 is mounted on the engine static structure 16 and is configured to provide rotational drive to accessory drive components 42 mounted on the gearbox 38. The accessory drive components 42 may include an oil pump, a fuel pump, a hydraulic pump, a starter and a generator, for example. In the example, the gearbox 38 is generally axially aligned with the compressor section of the engine 10.

A core compartment 46 is provided between the core nacelle 22 and the engine static structure 16. The gearbox 38 is arranged within the core compartment 46. An oil sump or oil tank 44 is also housed within the core compartment 46 in a position axially forward of the gearbox 38, as best shown in FIG. 1. In the example shown, the oil tank 44 is axially aligned with the compressor section, and in one example, axially aligned and outboard of the low pressure compressor section 28. In other examples, the gearbox 38 and/or tank 44 could be fan mounted (see FIG. 3).

The fan case 12 provides an outer structure 48. An inner structure 50 may be provided by the engine static structure 16, for example. The flow exit guide vanes 14 extend between and interconnect the outer and inner structure 48, 50.

Figure 2:
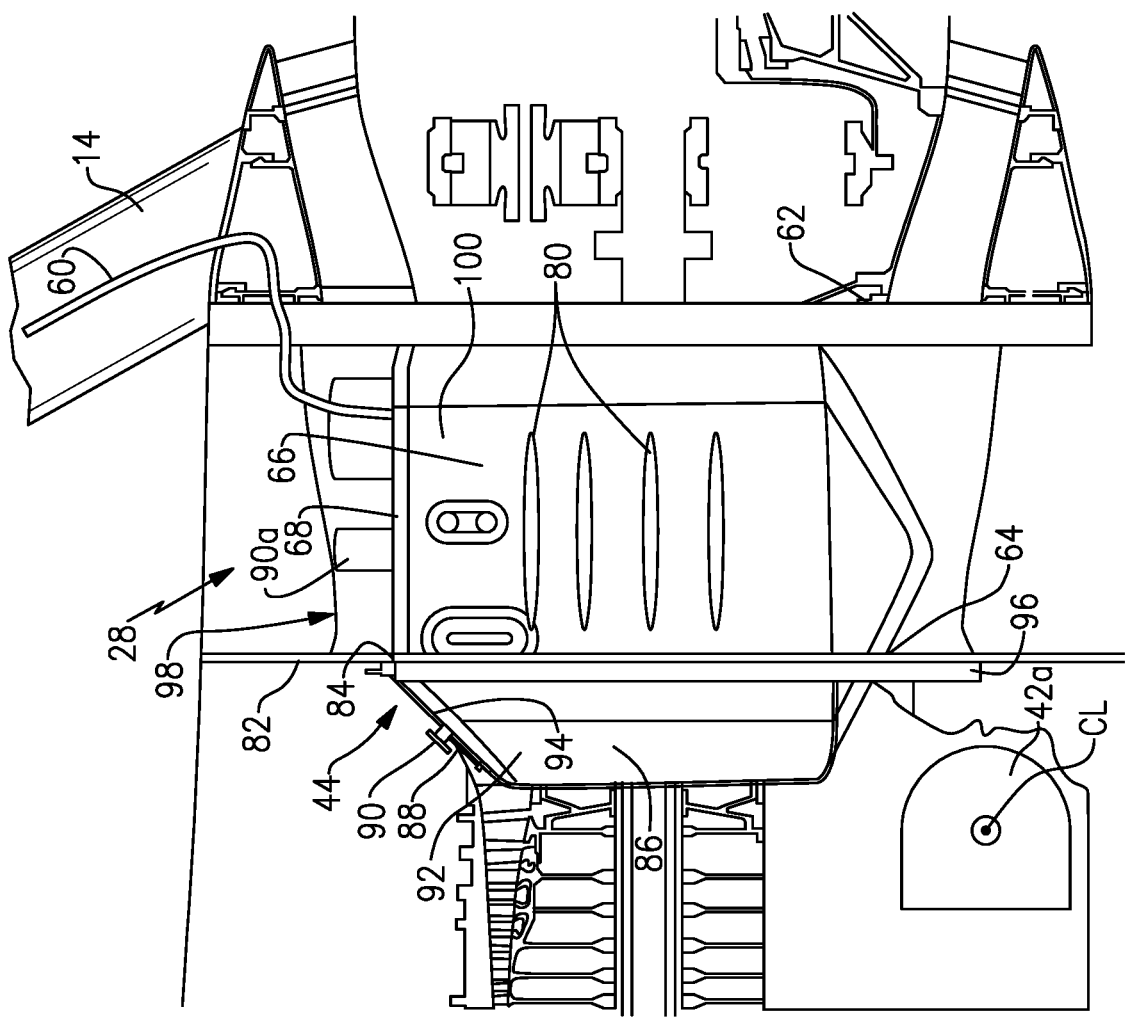
FIG. 2 is a side view of an oil tank mounting configuration as located within a core compartment of the gas turbine engine.

A secondary service fill connection is mounted on the outer structure 48 to provide oil to the oil tank 44. During a service operation, oil can be deposited through the secondary service fill connection, which extends through a flow exit guide vane or strut 14 and into a tubular connection 60 to the oil tank 44 as schematically shown in FIG. 2. This connection interface is shown in greater detail in co-pending application Ser. No. 13/465,637 filed on May 7, 2012 and entitled "Gas Turbine Engine Oil Tank," which is assigned to the assignee of the present invention and which is hereby incorporated by reference.

As shown in FIG. 2, the low pressure compressor section 28 includes a front mount flange 62 and an aft mount flange 64. The oil tank 44 is mounted to the front 62 and aft 64 mount flanges. The oil tank 44 has an integrated surface air oil cooler 66 that is formed as part of an outer surface 68 of the oil tank 44. The integrated configuration provides a very compact configuration from a packaging standpoint.

Figure 3:
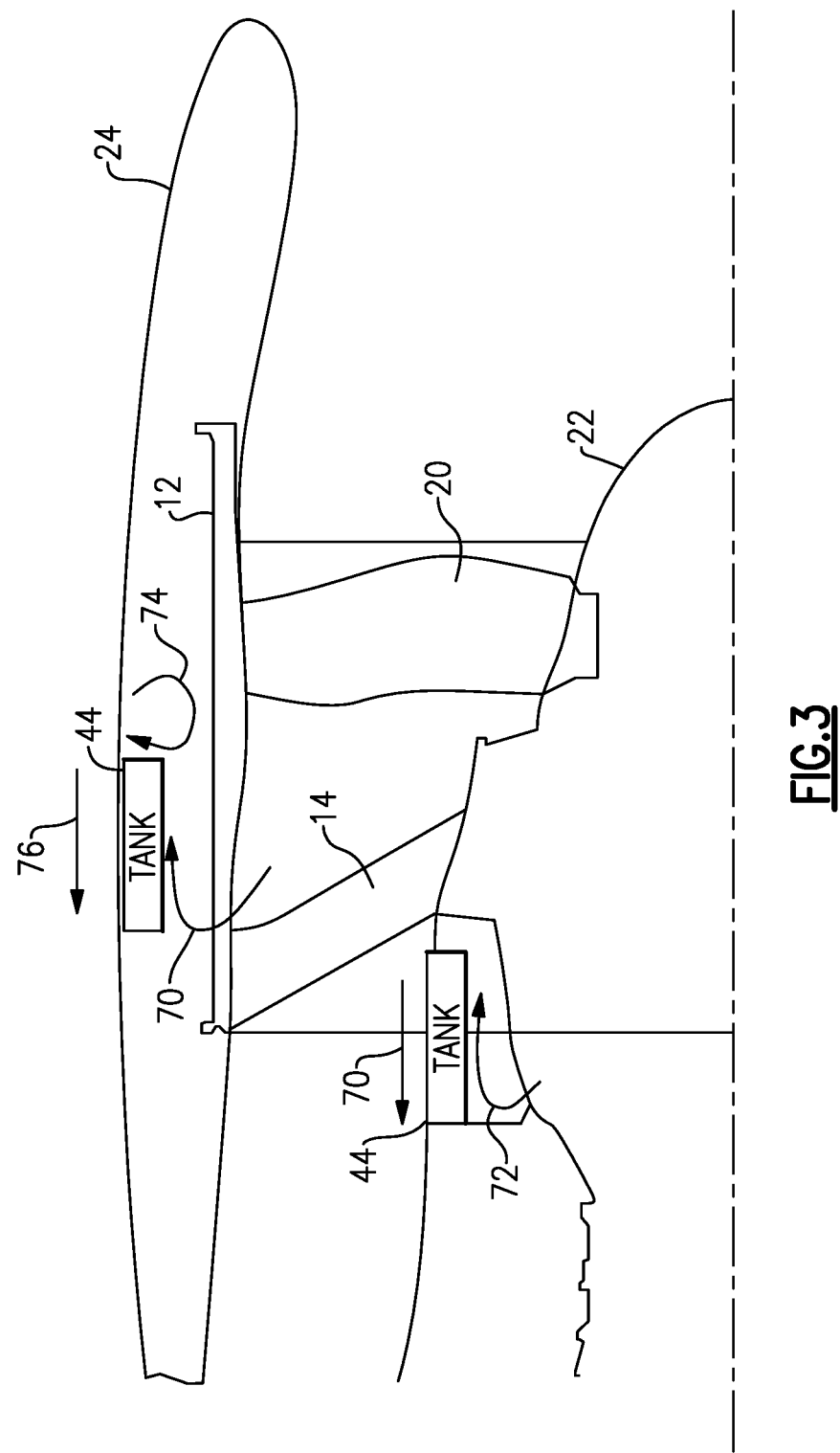
FIG. 3 is a schematic representation of source cooling air for the oil tank.

The integrated cooler 66 and oil tank 44 are exposed to cooling air flow from a plurality of air sources, which are shown in FIG. 3. For example, the plurality of air sources that cool the oil tank 44 and integrated cooler 66 comprise fan air flow 70, core engine bleed air flow 72, compartment ventilation air flow 74, and free stream air flow 76.

As shown in FIG. 2, the integrated cooler 66 is formed on the oil tank 44 at a location that is between the front 62 and aft 64 mount flanges. In one example, the integrated cooler 66 includes a plurality of ribs 80 to further enhance cooling.

The oil tank 44 is mounted to a firewall 82 at the aft flange mount 64. In one example, the top and bottom of the tank 44 are bolted directly to the firewall 82. The firewall 82 includes an opening 84 through which a portion of the oil tank 44 extends in an aft direction. This portion of the oil tank 44 comprises a main oil fill compartment 86. Thus, the main supply interface is at the firewall plane and is above a centerline CL of a pump 42a.

The main oil fill compartment 86 includes a sight glass 88 and an oil level sensor, schematically indicated at 90, which are located aft of the firewall 82. A top portion 92 of the main oil fill compartment 86 includes a surface for the main oil fill 94 and the sight glass 88. The sight glass 88 is positioned such that oil fill levels can be easily viewed during service operations. The tank may also include another oil level sensor 90a located forward of the firewall 82.

A nacelle interface 96, such as an inner v-groove or seal land for example, is incorporated into the outer surface 68 of the oil tank 44 adjacent the opening 84 in the firewall 82. The nacelle interface 96 is on an outer diameter of the tank 44 and is an interface for nacelle doors. The tank includes a flange that mates with the firewall 42 at their interface.

In order for the surface cooler to be most effective, cooling area should be maximized while volume is reduced. In one example, a de-aerator 100 is used to distribute oil along the tank/cooler surface on the return for cooling purposes. In one example, the de-aerator 100 is mounted on the outer surface 68 of the oil tank 44 at a position between the firewall 82 and front mount flange 62. As known, the de-aerator 100 assists with the cleaning of oil before it is returned back to the system. Any type of de-aerator can be mounted to the oil tank 44.

FIGS. 1 and 2 show an example of a core mounting configuration. FIG. 3 shows an alternate mounting location that comprises a fan mounted configuration with components mounted to the fan case 12.

The subject mounting configuration for the oil tank 44 allows the tank to be packaged such that a plurality of surfaces are exposed to cooling air flow from multiple sources. The exposed surfaces include cooling features to promote thermal transfers on both wet and aero sides.

Further, hot oil returning to the tank will be washed across the surfaces such that a deaerator function can also be integrated.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine engine comprising:
an engine static structure;
a fan case supported relative to the engine static structure by a radial structure;
a compressor section and a turbine section housed within the engine static structure, and a combustor section arranged axially between the compressor section and the turbine section;
a core nacelle enclosing the engine static structure to provide a core compartment; and
an oil tank mounted within the core compartment between a compressor mount flange and a firewall, the oil tank having a cooling structure integrated into an outer surface of the oil tank such that the oil tank is subjected to cooling air flow from a plurality of air sources, and wherein a main oil fill portion of the oil tank extends aft of the firewall, and including a service oil fill connection located in front of the firewall and extending through a fan exit guide vane to a fan case structure.

2. The gas turbine engine according to claim 1 wherein the cooling structure comprises an oil cooler integrally formed in the outer surface of the oil tank, the oil cooler including a plurality of ribs extending outwardly from the outer surface.

3. The gas turbine engine according to claim 1 wherein the oil tank comprises a main oil fill compartment that provides a main supply of lubrication for engine components, and wherein the cooling structure comprises an oil cooler that is integrally formed in the outer surface of the oil tank.

4. The gas turbine engine according to claim 1 wherein the plurality of air sources comprises at least one of fan air, core ventilation air, free stream air, and core bleed air.

5. The gas turbine engine according to claim 1 including a nacelle door interface incorporated into the outer surface of the oil tank.

6. The gas turbine engine according to claim 5 wherein the nacelle door interface comprises one of a seal land or an inner v-groove incorporated into the outer surface of the oil tank.

7. The gas turbine engine according to claim 1 including an accessory gearbox mounted on the engine static structure and configured to provide rotational drive to accessory drive components, and wherein the accessory gearbox is arranged within the core compartment with the oil tank and cooling structure being enclosed within the core compartment in a position axially forward of the accessory gearbox.

8. The gas turbine engine according to claim 1 wherein the compressor mount flange comprises a front compressor mount flange and wherein the compressor includes an aft compressor mount flange, wherein the oil tank is mounted to the aft compressor mount flange at the firewall.

9. The gas turbine engine according to claim 1 including an oil pump defining a centerline, and wherein the firewall includes an opening through which the main oil fill portion of the oil tank extends in an aft direction to provide a main supply interface at a firewall plane that is above the centerline of the oil pump.

10. A gas turbine engine comprising:
an engine static structure;
a fan case supported relative to the engine static structure by a radial structure; a compressor section and a turbine section housed within the engine static structure, and a combustor section arranged axially between the compressor section and the turbine section;
a core nacelle enclosing the engine static structure to provide a core compartment; and
an oil tank mounted within the core compartment between a compressor mount flange and a firewall, the oil tank having a cooling structure integrated into an outer surface of the oil tank such that the oil tank is subjected to cooling aft flow from a plurality of air sources, and wherein the compressor mount flange comprises a front compressor mount flange and wherein the compressor includes an aft compressor mount flange wherein the oil tank is mounted to the aft compressor mount flange at the firewall and wherein the cooling structure comprises an oil cooler integrally formed in the outer surface of the oil tank, the oil cooler including a plurality of ribs extending outwardly from the outer surface.

11. The gas turbine engine according to claim 10, wherein the plurality of air sources comprises at least one of fan air, core ventilation air, free stream air, and core bleed air.

12. The gas turbine engine according to claim 10, including an accessory gearbox mounted on the engine static structure and configured to provide rotational drive to accessory drive components, and wherein the accessory gearbox is arranged within the core compartment with the oil tank and cooling structure being enclosed within the core compartment in a position axially forward of the accessory gearbox.

13. The gas turbine engine according to claim 10, including an oil pump defining a centerline, and wherein the firewall includes an opening through which the main oil fill portion of the oil tank extends in an aft direction to provide a main supply interface at a firewall plane that is above the centerline of the oil pump.

14. The gas turbine engine according to claim 10, wherein a main oil fill portion of the oil tank extends aft of the firewall, and including a service oil fill connection located in front of the firewall and extending through a fan exit guide vane to a fan case structure.

15. A gas turbine engine comprising:
an engine static structure;
a fan case supported relative to the engine static structure by a radial structure; a compressor section and a turbine section housed within the engine static structure, and a combustor section arranged axially between the compressor section and the turbine section;
a core nacelle enclosing the engine static structure to provide a core compartment; and
an oil tank mounted within the core compartment between a compressor mount flange and a firewall, the oil tank having a cooling structure integrated into an outer surface of the oil tank such that the oil tank is subjected to cooling air flow from a plurality of aft sources, and wherein the compressor mount flange comprises a front compressor mount flange and wherein the compressor includes an aft compressor mount flange wherein the oil tank is mounted to the aft compressor mount flange at the firewall and wherein the oil tank comprises a main oil fill compartment that provides a main supply of lubrication for engine components, and wherein the cooling structure comprises an oil cooler that is integrally formed in the outer surface of the oil tank.

16. The gas turbine engine according claim 15 wherein the plurality of air sources comprises at least one of fan air, core ventilation air, free stream air, and core bleed air.

17. The gas turbine engine according to claim 15 including an accessory gearbox mounted on the engine static structure and configured to provide rotational drive to accessory drive components, and wherein the accessory gearbox is arranged within the core compartment with the oil tank and cooling structure being enclosed within the core compartment in a position axially forward of the accessory gearbox.

18. The gas turbine engine according claim 15 including an oil pump defining a centerline, and wherein the firewall includes an opening through which the main oil fill portion of the oil tank extends in an aft direction to provide a main supply interface at a firewall plane that is above the centerline of the oil pump.

19. The gas turbine engine according to claim 15 wherein a main oil fill portion of the oil tank extends aft of the firewall, and including a service oil fill connection located in front of the firewall and extending through a fan exit guide vane to a fan case structure.

* * * * *